(12) United States Patent
Constantin

(10) Patent No.: US 6,421,950 B1
(45) Date of Patent: *Jul. 23, 2002

(54) STRIKE INDICATOR FLY LINE

(76) Inventor: Thomas W. Constantin, 1635 Chesley, Dellwood, MO (US) 63136

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 529 days.

(21) Appl. No.: 08/932,988

(22) Filed: Sep. 18, 1997

(51) Int. Cl.$^7$ ............................................. A01K 91/12
(52) U.S. Cl. .................................................. 43/44.98
(58) Field of Search ........................................ 43/44.98

(56) References Cited

U.S. PATENT DOCUMENTS

| | | | | |
|---|---|---|---|---|
| 1,578,189 A | * | 3/1926 | Dawson | 43/44.98 |
| 1,830,411 A | * | 11/1931 | Schork, Jr. | 43/44.98 |
| 1,982,304 A | * | 11/1934 | Holden | 43/44.98 |
| 2,250,832 A | * | 7/1941 | Hedge | 43/44.98 |
| 2,610,539 A | * | 9/1952 | Hedge | 43/44.98 |
| 2,809,458 A | * | 10/1957 | Wilbourn | 43/44.98 |
| 3,043,045 A | | 7/1962 | Martuch | 43/44.98 |
| 3,868,785 A | * | 3/1975 | Foote | 43/44.98 |
| 3,888,037 A | * | 6/1975 | Warthen | 43/44.98 |
| 3,914,480 A | * | 10/1975 | Lang | 43/44.98 |
| 4,048,744 A | * | 9/1977 | Chandler | 43/44.98 |
| 4,336,087 A | * | 6/1982 | Martuch et al. | 43/44.98 |
| 5,207,732 A | | 5/1993 | Stark | 43/44.98 |
| 5,296,292 A | * | 3/1994 | Butters | 43/44.98 |
| 5,469,652 A | * | 11/1995 | Drosdak | 43/44.98 |
| 5,609,513 A | | 3/1997 | Stark | 451/59 |
| 5,625,976 A | | 5/1997 | Goodale | 43/44.98 |
| 5,659,994 A | * | 8/1997 | Cutter et al. | 43/44.98 |

FOREIGN PATENT DOCUMENTS

| | | | |
|---|---|---|---|
| FR | 1118521 | 6/1956 | |
| FR | 2586896 | * 3/1987 | 43/44.98 |
| GB | 06316 | 11/1911 | |
| GB | 220814 | 8/1924 | |
| GB | 1550177 | * 8/1979 | |
| GB | 2312602 | 11/1997 | |
| JP | 10-327724 | * 12/1998 | |
| JP | 11-32633 | * 2/1999 | |

OTHER PUBLICATIONS

Orvis Fishing And Outdoor 1997 Catalog, p. 50, HY–FLOTE Extra Zebra Line, Dec. 1996.*

Orvis Fishing and Outdoor 1997 Catalog, p. 50, HY–FLOTE Extra Zebra Line.

* cited by examiner

Primary Examiner—Darren W. Ark
(74) Attorney, Agent, or Firm—Grace J. Fishel

(57) ABSTRACT

A fly fishing line with a plurality of spaced apart bands along a section of the line visible to an angler. The bands and the spacing between the bands is such that they can be discerned in use by the angler. The bands do not interfere with casting of the line or with a leader attached to the line but can be watched by the angler to see when the line stops drifting or changes direction, indicating a fish strike, the bands and the spacing between the bands serving as a strike indicator.

8 Claims, 2 Drawing Sheets

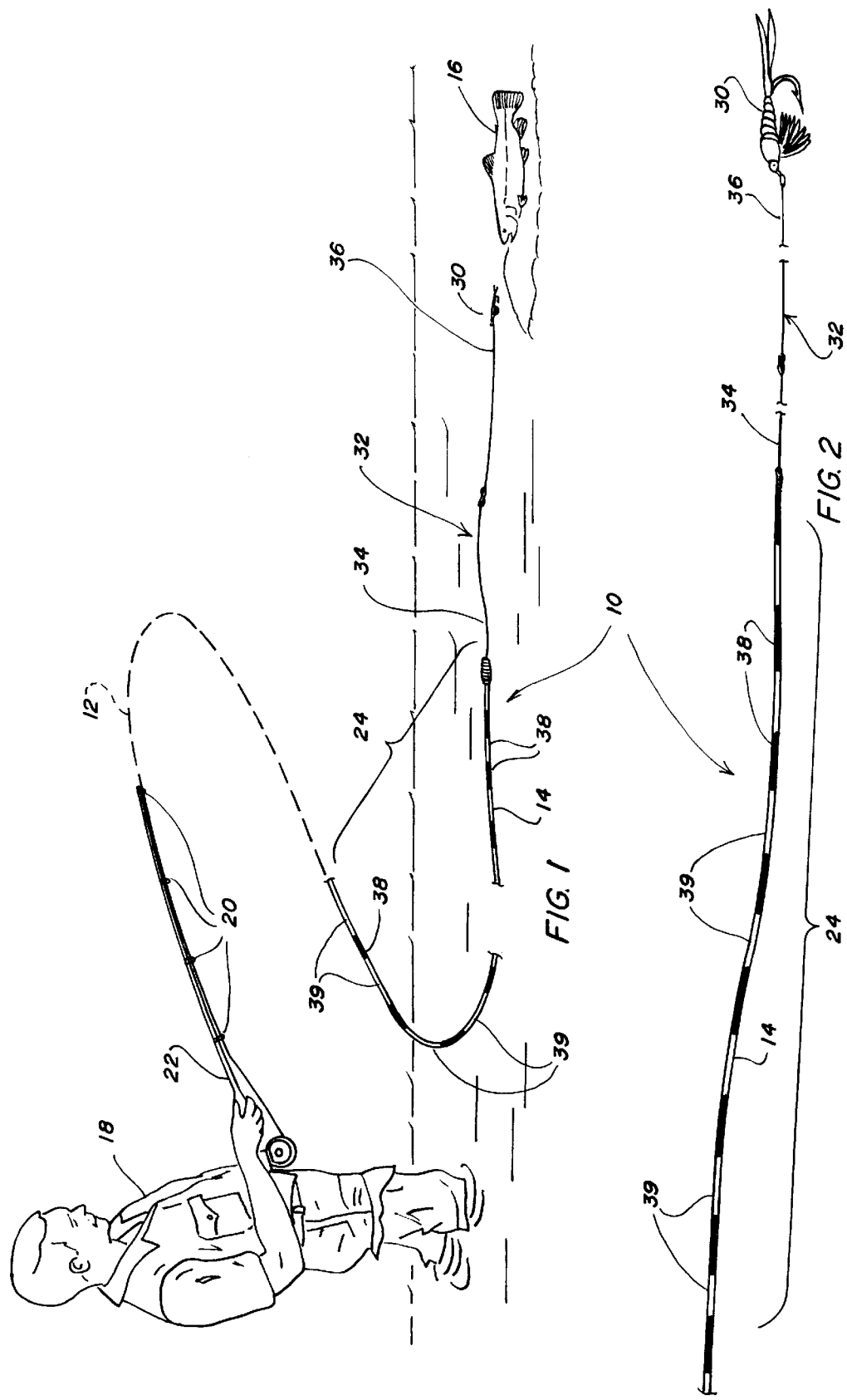

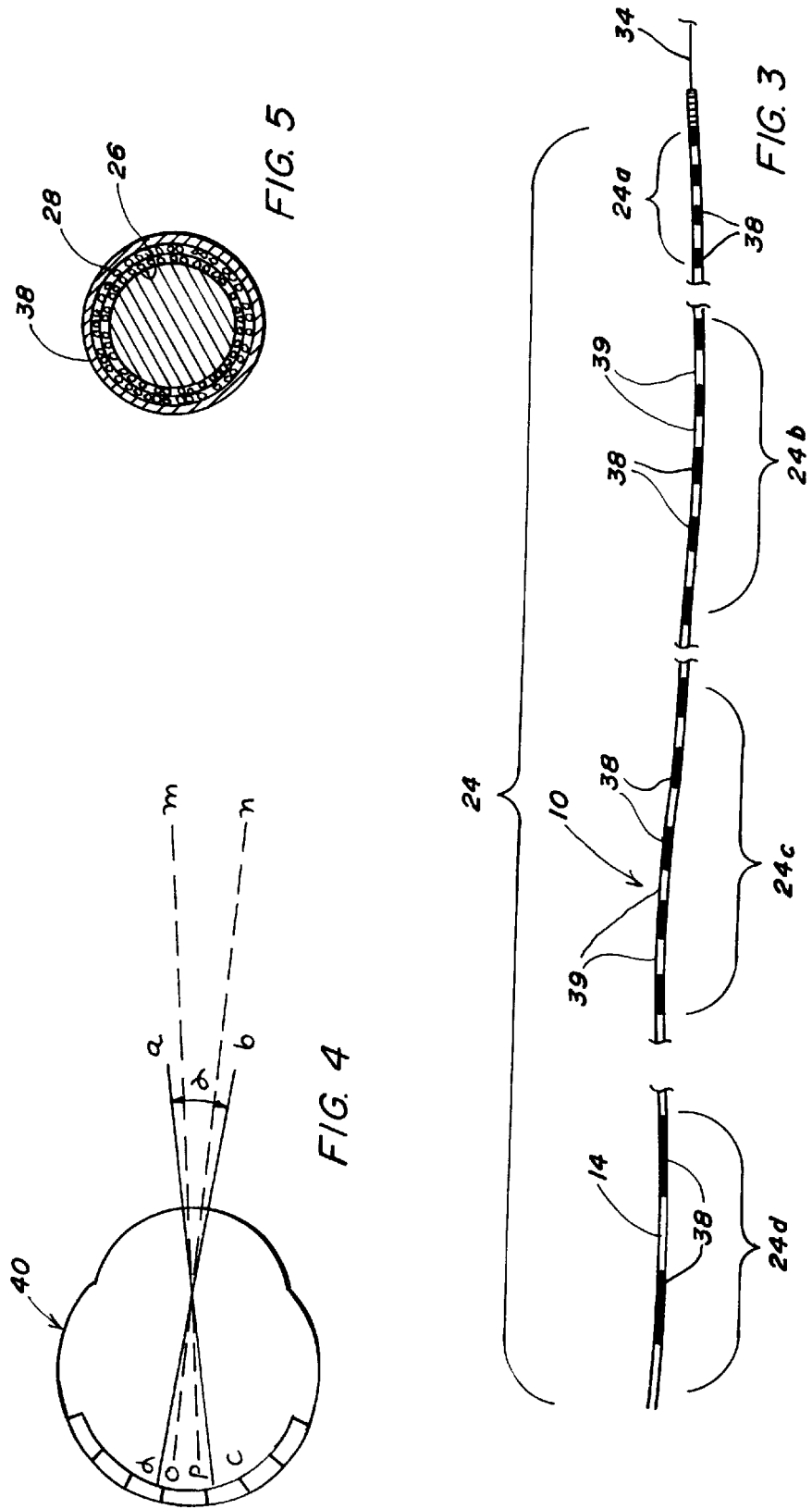

US 6,421,950 B1

STRIKE INDICATOR FLY LINE

BACKGROUND OF THE INVENTION

1. Field of the Invention

The present invention relates to a strike indicator fly line that can be easily seen by an angler but does not interfere with the performance of the fly line or leader.

2. Brief Description of the Prior Art

In fly fishing, a small substantially weightless hooked lure which resembles a fly or other bug is cast into the water. Normally the lure is attached to a monofilament "leader" which is virtually transparent in the water. The leader is attached to a line, which is usually opaque.

For most species of fish, the fly fisherman uses either a surface-type fly or one that swims underwater. Disregarding trout flies, for the moment, most other flies used to take fish in salt and fresh water fall into two categories: Popping bugs that sit on the surface and are designed to make noise, and streamers which are underwater flies and are designed to imitate baitfish or leeches. Among the most popular surface-type flies for trout are conventional dry flies, terrestrial, thorax, paradun, parachute, Griffin's Gnat style, no-hackle, spinner, Renegade or fore and aft style, skater, variant, caddis and stonefly. Underwater flies for trout include wet flies, nymphs, soft hackle flies and streamers.

When a lure is cast into the water, a fish may attack the lure for a variety of reasons including instinct, anger or hunger, during which time an angler has an opportunity to set the hook. If the lure floats unnaturally in the water or if the line or lure makes a big splash, the fish may be spooked and seek cover, avoiding the lure. Assuming that the fish attacks the lure, for the angler to hook the fish he must know that it is mouthing the lure. If the angler is using a surface-type fly, the line, leader and fly are all on the surface of the water and it is easier for the angler to make a strike at the appropriate moment. It is for this reason that most people prefer dry fly fishing for trout. Another factor, of course, is that it is very exciting to see a fish poke its head out of the water and take the lure.

Trout and many other fish, however, feed underwater nearly all of the time and are more likely to be taken on a lure that swims under the water. Knowing when a fish has taken a wet fly, nymph or the like is traditionally done by feel and takes more training to perfect than many people have time for.

An indicator, which the angler watches for an indication of a strike, is a blessing for inexperienced anglers and can make even experienced ones more productive. An indicator can be any small object that floats and is attached to the leader or line that can be easily seen. When the indicator changes drift direction, stops, or is pulled under, it means a fish has grabbed the lure and it is time to strike. An indicator is also an invaluable training aid as it helps the angler recognize much quicker the feel of a strike.

There are a number of different indicators. One of the most convenient to use is a commercial "stick on" closed-cell dumb bell-shaped pad. The pads have a contact glue back and are prepunched on a rectangular sheet. Individual pads are simply peeled off and pressed around the leader at the desired point. The pad has the advantage of relatively soft impact but it has a one-time use and does not pass through the guides on the rod.

Another type of indicator is a tiny ball with a hole through the center, being in effect a small bobber. The leader is inserted in the hole and the ball is positioned on the leader. To keep it at the selected point, a toothpick is inserted between the hole and the leader and the excess toothpick is broken off. This type of float has the disadvantage of hitting the water with a fairly loud splash. It is easy for the angler to see and is nearly indestructible but it, like the dumb bell-shaped pads, does not pass through the guides on the rod.

An indicator can be made from a small tube of closed-cell foam through which a heated wire is pushed. The leader is threaded through the hole and a small piece of yarn attached so that it protrudes from the top of the foam tube. When a fish pulls the foam tube under, the yarn comes to a vertical position. This indicator is very visible as the yarn alert makes the strike more noticeable. The indicator lands with a splash, however, and prevents the line from being totally wound up on the reel.

Indicators can also be made from yarn treated with a silicone fly floatant. Sections of yarn are tied to the leader with the ends trimmed to keep the leader tippet from twisting. This indicator has the distinct advantage of being able to wind it inside the guides but it does not float as well as closed-cell foam indicators and it must be clipped off when the angler is done fishing, thus destroying it.

BRIEF SUMMARY OF THE INVENTION

In view of the above, it is an object of the present invention to provide a strike indicator that does not interfere with the performance of the fly line or the leader. It is another object to provide a strike indicator that passes through the guides on a fly rod. It is also an object to provide a strike indicator that the fish do not see. Other objects and features of the invention will be in part apparent and in part pointed out hereinafter.

In accordance with the invention, a fly fishing line with first and second ends has a plurality of spaced apart bands along a section of the line visible to an angler at a selected viewing distance. Adjacent bands and the spacing between the bands subtend an angle at the selected viewing distance that is equal to or greater than the smallest angle subtended by a pair of objects which can be discerned visually by a person having normal vision.

An angler can cast the line into water and watch the bands to see when the line stops drifting or changes direction, indicating a fish strike, the bands and the spacing between the bands serving as a strike indicator. In some embodiments, the bands may be more closely spaced at the second end than the first end so that the angler can see smaller changes in movement of the line at the second end.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is an illustrative view of a strike indicator fly line in accordance with the present invention shown in use;

FIG. 2 is an enlarged side elevational view of a portion of the fly line;

FIG. 3 is an enlarged side elevational view of a portion of a second fly line in accordance with the present invention;

FIG. 4 is a diagram illustrating the resolving power of a retina; and,

FIG. 5 is a sectional view taken through the diameter of a fly line in accordance with the present invention.

DETAILED DESCRIPTION OF THE INVENTION

Referring to the drawings more particularly by reference character, reference numeral 10 refers to a strike indicator fly line in accordance with the present invention. As shown in FIGS. 1 and 2, line 10 has a first end 12 and a second end 14 and may be transparent or opaque. For the purpose of seeing an above-surface part of the line, line 10 is preferably opaque and may be colored or even florescent. Transparent lines are preferred in clear waters since they are less visible to a fish 16 but transparent lines are also more difficult for an angler 18 to see. Most fishing waters are somewhat cloudy or turbulent where an opaque, colored line, is nearly invisible. Under these conditions, an opaque, colored line is preferred so that the angler can better see the above-surface part of the line.

With continuing reference to FIGS. 1 and 2, fly line 10 may be tapered or not tapered. If tapered, the most common taper is weight forward at second end 14, the first 30 or so feet of line coming through guides 20 of a fly rod 22 being called the head. A forward tapered line when cast develops rapid line speed with the weight of the head carrying the rest of the line. Line 10 may also be double tapered. In this design, the line is thin at the head, gradually fattens out, and then slims again. With a double tapered line, the weight in the middle develops momentum, yet the portion of line 10 that lands nearest to fish 16 does so more delicately than with a weight forward tapered line.

Fly line 10 may be floating or sinking and, if floating, may have a sinking tip at second end 14. Except in very clear waters where line 10 is visible under the water when marked in accordance with the present invention, it is preferred that line 10, or a visible section 24 thereof, have a specific gravity less than 1 so that it floats. As shown in FIG. 5, fly line 10 is usually made with a core 26 which can be a monofilament, a braid or the like. When core 26 is a monofilament, it is preferably made of nylon, nylon being well known and widely available commercially. A coating 28 is arranged coaxially along core 26. Coating 28 may be frothed so that fly line 10 floats or weighted with solid glass spheres, or other high density material, so that it sinks. Frothed or weighted coating can be applied along various sections of fly line 10 in order to tailor the specific gravity of the line at various intervals. Thus, controlled density of predetermined or preselected line sections may be obtained. For example a certain line may desirably have a tip which has a specific gravity greater than 1 so that it sinks, the balance of the line having a specific gravity less than 1 so that it floats.

A lubricating dressing may be applied over coating 28 to enhance shootability, that is, the ability to propel fly line 10 and its fly or artificial lure 30, which is illustrated as a nymph in FIG. 2. Lubricating dressings now on the market include topical silicones, fluorocarbons, and waxes that reduce the coefficient of friction of the fly line in contact with rod guides 20. These dressings can also enhance floatability.

Fly line 10 can be offered in different lengths and in different weights, typically given numbers from 1 to 15. Most fly lines 10 are 70 to 90 feet long and are spliced at first end 12 to another hundred yards or so of thinner backing line and are wound on a spool.

Second end 14 of fly line 10 is attached to a leader 32 which may be of conventional design. Leader 32 may be tapered or non-tapered and weighted or non-weighted. When it is tapered, a butt end 34 is usually thicker with a tippet 36 being smaller in diameter. Leader 32 is usually made of a monofilament and is virtually transparent in the water. Butt 34 is attached to second end of fly line 10 and tippet 36 is attached to fly or artificial lure 30.

For use as a strike indicator, fly line 10 has a plurality of spaced apart bands 38 along section 24 of the line visible to angler 18 at a selected viewing distance. When line 10 is transparent, whether sinking or non-sinking, bands 38 may be applied to the entire length of the line. When line 10 is opaque and floating, bands 38 may be applied to the whole line or, if preferred, only at second end 14. If it has a sinking tip, bands 38 may be applied on just the floating section of the line, as the section underneath the water would not be visible to angler 18 but might be visible to the fish.

Bands 38 are applied to core 26, coating 28 or the lubricant, for example with a permanent marker or the like. Bands 38 may be formed in coating 28 as the coating is applied over core 26 or as segments of shrink tubing which are applied over the coating and heated to shrink fit. When bands 38 are applied to core 26, coating 28 must be sufficiently transparent so that the bands can be seen. When line 10 is opaque and light in color, bands 38 are preferably black or dark blue. Bands 38, however, may be florescent, particularly on a transparent line, or any other color combination with an adequate degree of contrast.

To be useful as a strike indicator, bands 38 and the spacing 39 between them must be visible on that section 24 of the line in view of angler 18 at a selected viewing distance. For this to occur, the bands must be spaced at intervals within the resolving power of a person with normal vision. As shown in FIG. 4, "a" and "b" represent two adjacent bands 38 or the spacing between them, with the foci of these objects at "c" and "d" on the retina of an eye 40. It is thought that when these two foci or images fall most sharply or intensely upon two discrete cones separated by a third cone, which is not so intensely stimulated, the two retinal images call forth in the brain two discrete sensations; that is, the individual sees "a" and "b" (bands 38 or spaces between the bands in the present instance) as two separate objects. If the points are placed farther from the eye, at "m" and "n", the foci, "o" and "p", fall either upon two neighboring cones or upon a single cone and the two points are seen as one object. Angle alpha is the smallest angle subtended by two neighboring objects (e.g., bands 38 or the spacing 39 between them) which can be seen by the eye as separate and is believed to be between about 30 and 60 minutes.

Within the above-mentioned parameters, various fly lines 10 can be designed: one with bands 1 foot wide, spaced at 1 foot intervals being acceptable for most purposes. To enable angler 18 to detect finer movements, however, bands 38 may be narrower and spaced more closely together at second end 14. For example as shown in FIG. 3, in the last ten feet of the line at second end 14, bands 38 and the spacing 39 between them may graduate in size from 3 inches (section 24a) to 12 inches (section 24d), separated by intermediate sections 24b and 24c with bands and the spacing 39 between them being 4 inches and 6 inches, respectively. In general, bands 38 and the spacing 39 between bands 38 are equal in width except at such intervals where the width of the bands is changing.

In use, angler 18 casts line 10 into water in a customary manner. He then watches for the line to stop drifting or for changes in direction, which movement he can see by watching bands 38. When that occurs, he knows that fish 16 is likely mouthing fly or artificial lure 30, at which moment he has an opportunity to set the hook. Unlike prior art strike indicators, bands 38 pass through guides 20 of rod 22 and do not interfere with casting or reeling in the line. Bands 38, which in most instances add no weight at all, do not interfere with the way in which the fly line casts, nor do they interfere with the action of the leader which is the stealth portion of the line system, permitting skillful presentation of fly or artificial lure 30. Unlike conventional strike indicators, bands 38 do not cause the fly line to land with a splash when the line is cast or plow the water, disturbing the surface film and spooking the fish, as the line is stripped. Angler 18 is also less inclined to squint or develop eye strain while watching line 10 than a conventional fly line. Squinting and eye strain are particularly a problem for long liners fishing with streamers, emergers and nymphs. Line 10 is also particularly useful in white water, around rocks and stumps, or under unfavorable light conditions as where there is glare. In these circumstances, for example, instead of trying to see a small fly 30 or 50 feet away, angler 18 can point his rod in the direction of the fly and stick the tip of the rod, just under the surface film, and start stripping. He need only look at line 10, 4 to 10 feet away, for changes in the drift.

By fan casting line 10, angler 18 can find the active feeding areas more effectively than with a conventional strike indicator as bands 38 allow him to see strikes by small fish which would otherwise be missed. Large fish are usually found in the same areas as little fish, upon which they feed, thus the angler can find the areas where the big fish are, avoiding wasting time on non-productive waters where there are likely to be no dramatic strikes.

Fish sometimes attack a conventional strike indicator, giving a false indication that a fish has taken the fly or artificial lure. If the angler jerks the line, any opportunity to catch the big fish that was eying the lure will probably be missed as it will run for cover or the lure will be moved out of striking range. Bands 38, on the other hand, are on line 10 and not on leader 32 and the fish pay no attention to them.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A fly fishing line having first and second ends, said first end adapted for attachment to a reel or a backing line and said second end adapted for attachment to a leader, said line having a strike indicator comprising a plurality of regular, distinct light and dark, alternating bands and spacings of similar widths beginning at the second end and continuing along a substantial portion of the line, said regular, distinct, alternating bands subtending an angle when the line is cast that is equal to or greater than the smallest angle subtended by a pair of objects which can be discerned visually by a person having normal vision, whereby an angler can cast said line into water and watch said strike indicator to see when the line stops drifting or changes direction, indicating a fish strike.

2. The fly fishing line of claim 1 wherein the bands are more closely spaced at the second end than at the first end whereby an angler can see smaller changes in movement of the line at said second end.

3. The fly fishing line of claim 1 having a core and a coating extending coaxially along said core, said bands being applied to the coating.

4. The fly fishing line of claim 1 having a core and a coating extending coaxially along said core, said bands being formed in the coating as the coating is applied over the core.

5. The fly fishing line of claim 1 having a core and a coating extending coaxially along said core, said bands being segments of shrink tubing which are applied over the coating and heated to shrink fit.

6. The fly fishing line of claim 1 wherein the entire line has a specific gravity less than 1 and the bands are more closely spaced at the second end than at the first end whereby an angler can see smaller changes in movement of the line at said second end.

7. The fly fishing line of claim 1 wherein the bands are graduated in size from the second end becoming larger in the direction of the first end.

8. The fly fishing line of claim 7 wherein the bands in the last ten feet of line at the second end graduate in size from 3 inches to 12 inches with the bands and the spacing between said bands being of equal width except at such intervals where the width of the bands is changing.

* * * * *